Figure 1:
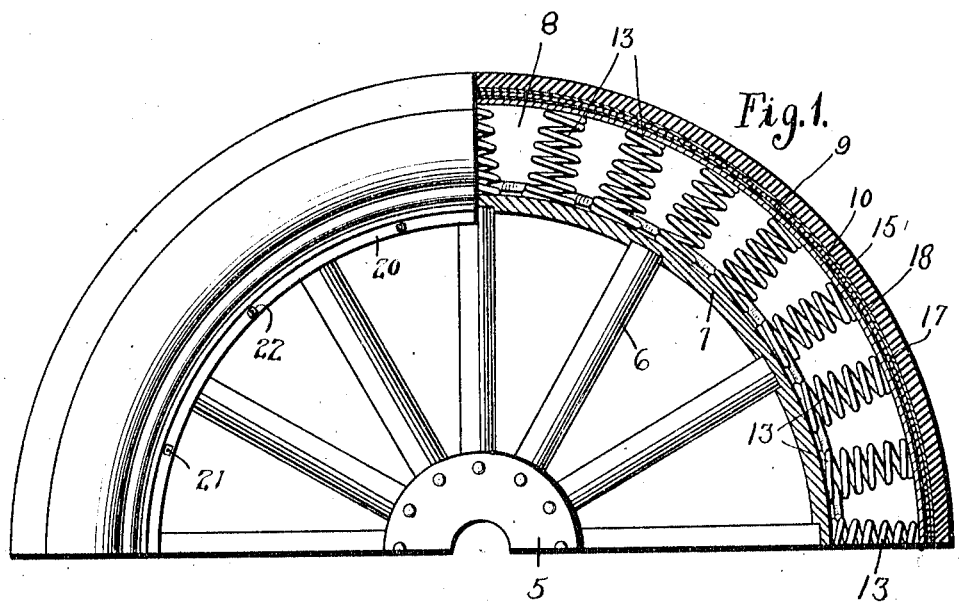

G. STEVER.
TIRE.
APPLICATION FILED SEPT. 15, 1916.

1,314,764.

Patented Sept. 2, 1919.

WITNESSES
Arthur K. Moore

INVENTOR
Guy Stever
BY Richard Owen,
ATTORNEY

UNITED STATES PATENT OFFICE.

GUY STEVER, OF AKRON, OHIO.

TIRE.

1,314,764.  Specification of Letters Patent.  Patented Sept. 2, 1919.

Application filed September 15, 1916. Serial No. 120,333.

*To all whom it may concern:*

Be it known that I, GUY STEVER, a citizen of the United States, residing at Akron, in the county of Summit and State of Ohio, have invented certain new and useful Improvements in Tires, of which the following is a specification.

This invention relates to vehicle wheels, and particularly to tires therefor.

The invention aims primarily to provide a tire which obviates the use of the now generally employed inflatable pneumatic tire, and yet which possesses all of the advantages and qualities of such a tire. A further object of the invention is to provide a tire comprising a metallic casing equipped with resilient shock absorbing members, which is capable of being readily attached to or detached from vehicle rims now commonly used, such as the "clencher", "straight side", and "quick detachable". A still further object of the invention is to provide a device of this character which will act efficiently to absorb shocks and jars to which the wheel will be subjected, which has its shock absorbing elements so arranged as to prevent wear, breakage, or dismemberment of the same, which may be manufactured and maintained at low cost, and which will prove thoroughly efficient in the attainment of the various ends for which it is designed.

In the drawings:—

Figure 2:
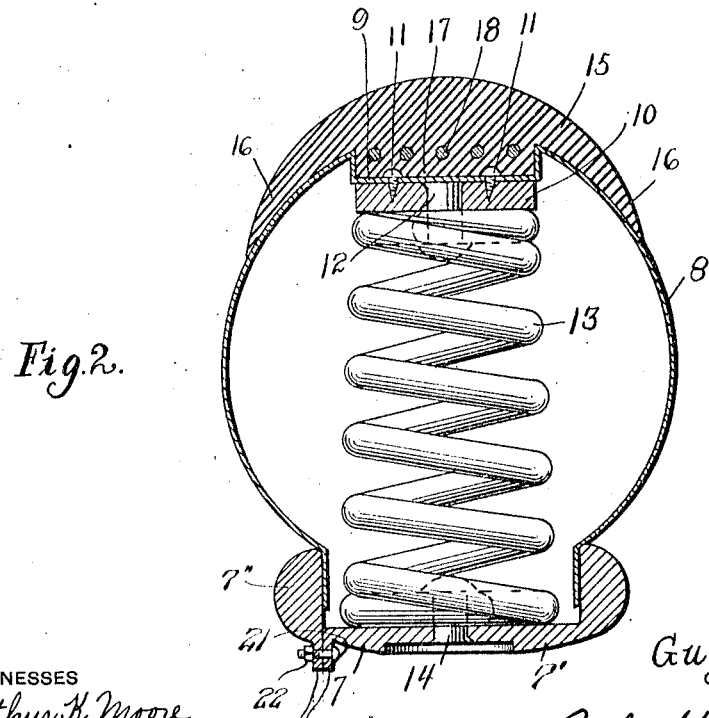

Figure 1 is a fragmentary side elevation, partly in section, of a tire constructed in accordance with the invention, the said tire being shown as applied to a conventional form of wheel; and Fig. 2 is an enlarged transverse sectional view taken through the improved tire and illustrating the same connected to a vehicle wheel rim.

Referring to the drawings, 5 indicates the hub of a conventional form of vehicle wheel, from which spokes 6 project, the latter supporting the usual wheel rim or felly 7. The rim 7 is of a sectional construction, comprising the primary section 7' and the auxiliary section 7''. These sections are provided with abutting flanges 20 as shown in Fig. 2, whereby the flanges may be connected together by bolts 21 held in place by nuts 22. Thus it will be seen that the rim is of such construction as will facilitate the assembly of the tire.

In carrying out the invention, I construct a casing or shell 8 of relatively thin spring metal, which is of annular formation and of a size to snugly fit over the vehicle rim. This casing may be formed of a single piece of elongated metal, bent or shaped transversely to form a shell, the edges of which are to be engaged by the vehicle rim 7. The central portion of the metal of which the casing is formed is depressed as illustrated at 9, so that an annular relatively shallow channel is formed at the tread portion of the casing. The bottom wall of this depression is preferably parallel with the tread surface of the vehicle rim, as illustrated in Fig. 2. A steel spring band 10 is arranged within the tire casing and upon the inner surface of the depressed portion 9, the said band being of substantially equal width with the said depressed portion. The band is illustrated as being secured to the depressed portion of the casing by means of screws 11. Projecting inwardly from the central portion of the band 10 at regular spaced intervals throughout the circumference thereof are studs or rivets 12, to the inwardly projecting ends of which are secured the outer extremities of expansion springs 13, the said springs being arranged radially within the casing and are secured at their inner ends to studs or bolts 14 projecting outwardly from the rim 7 in radial alinement with the studs 12. It is preferred that the ends of the springs be looped so as to tightly fit with the studs, without weakening the spring ends, and assuring the said springs of being at all times maintained in proper radial position. It will be observed that the innermost edges of the tire casing fit snugly within the sectional rim 7, whereby dust, sand or grit will be prevented from gaining access to the interior of the casing.

A tread member 15 is applied to a tire of this character to assist in absorbing the shocks to which the wheel will be subjected, and to obviate the occurrence of noise as the rotating wheel contacts the ground. This tread member is of circular formation and is adapted to snugly fit upon the tread surface of the casing. The tread member is also rounded upon its bearing surface and is shaped to provide a pair of annular oppositely disposed wing portions extending part way over the side portions of the casing 8. The central portion of the tread is provided upon its inner surface with an inwardly projecting annular rib 17 of a width equal to that of the channel formed in the depressed portion of the casing 8. This rib portion 17 has embedded therein, circular reinforcing hoops or wires 18, the same being connected at their ends in any suitable manner, and provide reinforcing elements for the tread member.

From the foregoing, it is apparent that I have provided an extremely simple and yet thoroughly efficient means for attaining the objects set forth. The tire is constructed in such manner that sufficient play may take place and the springs arranged in radial series throughout the extent of the tire to absorb shocks caused by vibration of the tire. The tread member being formed of hard rubber or like material, assists in absorbing shocks, forms a gripping surface for the tread of the wheel, and deadens the noise which would be caused by the engagement of a metal tread surface with the ground.

While the present is a disclosure of the preferred embodiment, it is obvious that various changes in the minor details of construction and arrangement of parts may be resorted to, without departing from the spirit of the invention or exceeding the scope of the claim, and the right to make such variation is hereby reserved.

What is claimed is:—

In a tire, a metallic plate formed of spring steel curved inwardly at its edges to provide an annular casing, the portion of said plate constituting the tread being depressed and providing an annular channel concentric with the said casing, a spring band secured within the casing and to the bottom of said depressed portion, expansion springs connected at their outer ends to the said band, the said springs being adapted to seat at their inner ends against the rim of the wheel, and the said depressed portion being adapted to receive a cushion tire.

In testimony whereof I affix my signature in presence of two witnesses.

GUY STEVER.

Witnesses:
A. S. HELPBRINGER,
CHAS. N. QUILLEN.